Patented Nov. 7, 1950

2,529,455

UNITED STATES PATENT OFFICE 2,529,455

PROCESS FOR PREPARING UNSATURATED AMIDES

David T. Mowry, Dayton, Ohio, assignor to Monsanto Chemical Company, St. Louis, Mo., a corporation of Delaware No Drawing. Application December 30, 1947, Serial No. 794,816

4 Claims. (Cl. 260—326)

This invention relates to a new family of chemical compounds and to methods for preparing them. More particularly this invention relates to polymerizable compositions having unusual properties as are hereinafter fully described.

The new chemical compounds are prepared by the condensation of acrylonitrile or methacrylonitrile with the methylol derivatives of various aromatic amides or aromatic imides. The new chemical compounds have the folowing structural formula:

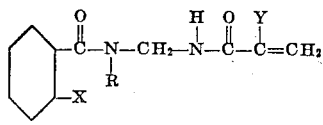

wherein R and X may be hydrogen, or in which X and R together may be the carbonyl radical or the sulfonyl radical, and Y may be either hydrogen or the methyl radical.

The new chemical compounds are prepared from the aromatic amides or imides first by condensing them with an equal molecular proportion of formaldehyde to form the corresponding methylol derivative and then by reaction with the unsaturated nitrile in the presence of an acid catalyst to form the new compounds.

The reactions may be catalyzed with any strong mineral acid, for example sulfuric, hydrochloric, hydrofluoric, sulfurous, phosphoric, or other inorganic acid having an ionization constant at least as great as that of phosphoric acid. The presence of a solvent, such as dioxane, formic acid or acetic acid is frequently desirable. The reaction takes place immediately upon mixing the reagents and is often so vigorous that cooling is necessary to prevent excessive increases in temperature. The reagents are usually mixed gradually to maintain a low or moderate temperature (5° C. to 30° C.) in the reaction vessel, and after the mixing of reagents has been completed it is frequently advantageous to allow the temperature to rise, or to warm the reaction mass to 20 to 40° C. to insure completion of the reaction. The resulting compounds are separated from the mixture by pouring into water or ice and filtering of the precipitated solid product, which may then be further purified by recrystallization from ethanol and/or benzene.

The new chemical compounds are useful as intermediates in the formation of plasticizers, drugs, and other chemical compounds, but are especially valuable as monomers in the preparation of synthetic resins by polymerization. The new compounds may be polymerized by themselves or conjointly with a wide variety of other polymerizable monomers, for example vinyl chloride, vinylidene chloride, vinyl acetate, styrene, butadiene, methyl methacrylate or methyl acrylate.

Further details of the preparation of the new chemical compounds are set forth with respect to the following specific examples.

Example 1

One hundred seventy seven parts of N-methylol phthalimide, M. P. 146–148° C. (prepared from formaldehyde and phthalimide), was dissolved in 250 parts of glacial acetic acid and 450 parts of concentrated sulfuric acid. Then 53 parts of acrylonitrile were added with stirring and cooling at 33–35° C. The temperature was raised to 40° C. for one hour after addition was complete. The resulting solution was filtered from a small amount of insoluble material and poured in a large excess of cold water. A 95 percent yield of solid product was obtained which melted at 193° C. after recrystallization from hot ethanol. It was identified as N-phthalimidomethyl acrylamide.

Example 2

The process of Example 1 was repeated except that 67 parts of methacrylonitrile was substituted for acrylonitrile. The product obtained in 89 percent yield was identified as N-phthalimidomethyl methacrylamide.

Example 3

Twenty-six parts of acrylonitrile was dissolved in a mixture of 180 parts of concentrated sulfuric acid and 100 parts of glacial acetic acid at 0–5° C. Then 66.5 parts of N-methylol benzamide (M. P. 100–102° C.) was added in small portions, keeping the temperature below 5° C. The mixture was then stirred at 5–10° C. for one hour and quenched with ice water. The solid product, obtained in 83 percent yield, was identified as N-benzamidomethyl acrylamide.

Example 4

Fourteen parts of acrylonitrile were dissolved in a mixture of 100 parts glacial acetic acid and 180 parts of sulfuric acid at 0° C. Then 54 parts of N-methylol saccharin (N-methylol-o-benzoyl-sulfimide) M. P. 125–129° C., was added in small portions at 5° C. The reaction was allowed to warm to room temperature overnight and quenched with an excess of water. The precipitated solid was filtered and recrystallized successively from ethanol and benzene to give a product melting at 167–168° C. It was identified as N-o-benzoyl sulfimidomethyl acrylamide.

Although this invention has been described with respect to specific embodiments thereof, it is not intended that the details shall be construed as limitations on the invention except to the extent incorporated in the following claims.

I claim:

1. A method of preparing new compounds which comprises mixing a methylol derivative having the structure:

$$X-CH_2-OH$$

wherein X is a radical of the group consisting of

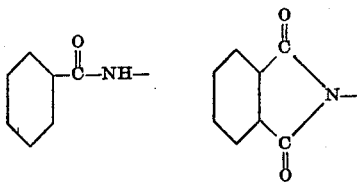

and

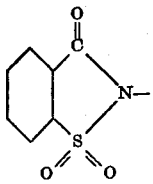

with a compound of the group consisting of acrylonitrile and methacrylonitrile in the presence of an acid catalyst having an ionization constant at least as great as that of phosphoric acid at a temperature below 40° C., and separating the resulting compound by contacting the reaction mass with water.

2. A method of preparing N-phthalimidomethyl acrylamide which comprises mixing N-methylol-phthalimide with acrylonitrile in the presence of an acid catalyst having an ionization constant at least as great as phosphoric acid at a temperature below 40° C., and separating the N-phthalimidomethyl acrylamide, by contacting the reaction mass with water.

3. A method of preparing N-benzamidomethylacrylamide which comprises mixing N-methylolbenzamide with acrylonitrile in the presence of an acid catalyst having an ionization constant at least as great as phosphoric acid at a temperature below 40° C., and separating the N-benzamidomethyl acrylamide by contacting the reaction mass with water.

4. A method of prepring N-phthalimidomethylmethacrylamide which comprises mixing N-methylol-phthalimide with methacrylonitrile in the presence of an acid catalyst having an ionization constant at least as great as phosphoric acid at a temperature below 40° C., and separating the N-phthalimidoethyl methacrylamide by contacting the reaction mass with water.

DAVID T. MOWRY.

REFERENCES CITED

The following references are of record in the file of this patent:

UNITED STATES PATENTS

| Number | Name | Date |
|---|---|---|
| 2,279,497 | Sallmann et al. | Apr. 14, 1942 |
| 2,320,089 | Lichty | May 25, 1943 |

OTHER REFERENCES

Beilstein, 4th ed., vol. 21, page 459.